United States Patent [19]
Goodfellow

[11] 3,847,235
[45] Nov. 12, 1974

[54] ROLLING TYPE EXCAVATING TOOL
[75] Inventor: Robert D. Goodfellow, Bedford, Pa.
[73] Assignee: Kennametal Inc., Latrobe, Pa.
[22] Filed: Oct. 10, 1973
[21] Appl. No.: 405,091

[52] U.S. Cl.................. 175/372, 175/374, 308/8.2
[51] Int. Cl...... F16c 19/14, E21b 9/08, E21c 13/01
[58] Field of Search................... 175/371, 372, 374; 308/8.2

[56] References Cited
UNITED STATES PATENTS

| | | | |
|---|---|---|---|
| 1,858,980 | 5/1932 | Behnke............................ | 175/372 X |
| 2,009,300 | 7/1935 | Reed.................................. | 308/8.2 |
| 2,058,624 | 10/1936 | Reed.................................. | 175/372 X |
| 2,076,000 | 4/1937 | Reed.................................. | 308/8.2 |
| 2,210,077 | 8/1940 | Hanly................................. | 308/8.2 |
| 2,513,634 | 7/1950 | Franis................................ | 308/8.2 |
| 2,787,502 | 4/1957 | Huckshold........................ | 308/8.2 |
| 3,193,028 | 7/1965 | Radzimovsky................... | 175/372 |
| 3,550,972 | 12/1970 | Coski................................. | 308/8.2 |

FOREIGN PATENTS OR APPLICATIONS
1,053,319  2/1954  France............................... 175/372

Primary Examiner—David H. Brown
Attorney, Agent, or Firm—Melvin A. Crosby

[57] ABSTRACT

A rotating type excavating tool or cutter in which a cutter body is formed with a blind hole into which a spindle extends with antifriction bearings interposed between the spindle and the body with a clamp nut on the spindle at the bottom of the blind hole. Access is had to the nut for tightening the nut up during assembly, or for loosening the nut for disassembly purposes by at least one hole formed in the cutter body in the range of the bottom of the blind hole and which are plugged after the nut is tightened to prevent foreign matter from getting into the blind hole in the cutter body.

16 Claims, 8 Drawing Figures

ROLLING TYPE EXCAVATING TOOL

The present invention relates to excavating tools, and is particularly concerned with a rolling type excavating tool, and especially a tool of this nature in which a support shaft or spindle is cantilevered on a support and is received in a blind hole in a cutter body.

Rolling cutter arrangements of the nature with which the present invention is concerned are employed for excavating operations, particularly where hard formations are to be reduced. The rolling cutters are sometimes employed as a single cutter and on other occasions they are grouped in groups of two or three. U.S. Pat. No. 3,389,761 shows a drill bit with a group of three such rolling cutters.

In at least the last mentioned case, the support shafts or spindles for the cutters angle downwardly toward a common center point on the axis of rotation of the tool and each shaft or spindle has rotatably mounted thereon a cutter body which is substantially triangular in cross sectional configuration. Tools of this nature are sometimes used as a complete tool in itself and on other occasions are employed as pilot cutters for larger tools.

The supporting of the cutter body on the spindle is important because the cutter bodies are subjected to extreme abuse when working, particularly where the cutter is employed for reducing hard formations. Because of this, the spindle must be of substantial size, and it is preferable to mount the body on the spindle by the use of antifriction bearings which journal the body against both radial and axial thrusts imposed thereon.

With the spindle extending into a blind hole in the cutter body, the problem presents itself of securing the body in position while fixedly clamping the bearings interposed between the spindle and the body in place under proper preload.

The present invention has a primary objective the provision of a rolling cutter type excavating tool of the nature referred to which has a novel arrangement for tightening the nut that holds the cutter in assembled relation.

Another object is the provision of an arrangement for rotatably mounting a cutter on a spindle in which the spindle extends into a blind hole in the cutter with a nut mounted on the free end of the spindle.

BRIEF SUMMARY OF THE INVENTION:

According to the present invention, a support member is provided and extending angularly therefrom is a spindle. The support member and spindle are preferably formed integrally for purposes of strength and a cutter body is provided having a blind hole into which the spindle extends.

The possibility presents itself, however, that drill bits can be repaired by boring a hole in a support member and welding a spindle therein whereupon a bit body can be mounted on the spindle according to the present invention.

A larger antifriction bearing is interposed between the body and spindle adjacent the support while a smaller antifriction bearing is interposed between the body and the spindle adjacent the free end of the spindle. The antifriction bearings are preferably tapered roller bearings and each tapers inwardly toward the other. A nut on the bottom of the blind hole in the cutter body is threaded on the free end of the spindle and engages the inner race of the smaller antifriction bearing.

The larger antifriction bearing is designed to sustain most of the axial thrust on the cutter body while the smaller antifriction bearing is disposed to sustain mostly radial loads.

The outer race of the smaller antifriction bearing is abutted at the end opposite the nut by a snap ring in the cutter body. The cutter body also abuts the end of the outer race of the larger antifriction bearing which faces the free end of the spindle while the opposite end of the inner race of the larger bearing engages an abutment which is stationary relative to the spindle.

Advantageously, a seal is provided between the open end of the blind hole in the cutter body and the adjacent end of the spindle to exclude foreign matter such as grit from inside the cutter body.

According to the present invention, the nut on the free end of the spindle is provided with holes or notches and is engageable through at least one, preferably two, holes formed in the cutter body within the range of the bottom of the blind hole. With the nut so engaged, the cutter body can be rotated on the spindle and thereby tighten the nut up on the spindle and, thus, fixedly clamp the cutter body and antifriction bearings in place on the spindle while preloading the bearings to a desired degree.

After the nut has been tightened up, it is advantageously locked in place by pinning it to the spindle, or by deforming a region of the threads on the end of the spindle. Thereafter, the hole, or holes, formed in the cutter body is plugged to exclude foreign matter from inside the cutter body. A pipe plug can be used to plug the hole with the radially inner end of the plug flush with the periphery of the recess in which the nut is located.

The exact nature of the present invention will become more clearly apparent upon reference to the following detailed specification taken in connection with the accompanying drawings in which.

Figure 1:
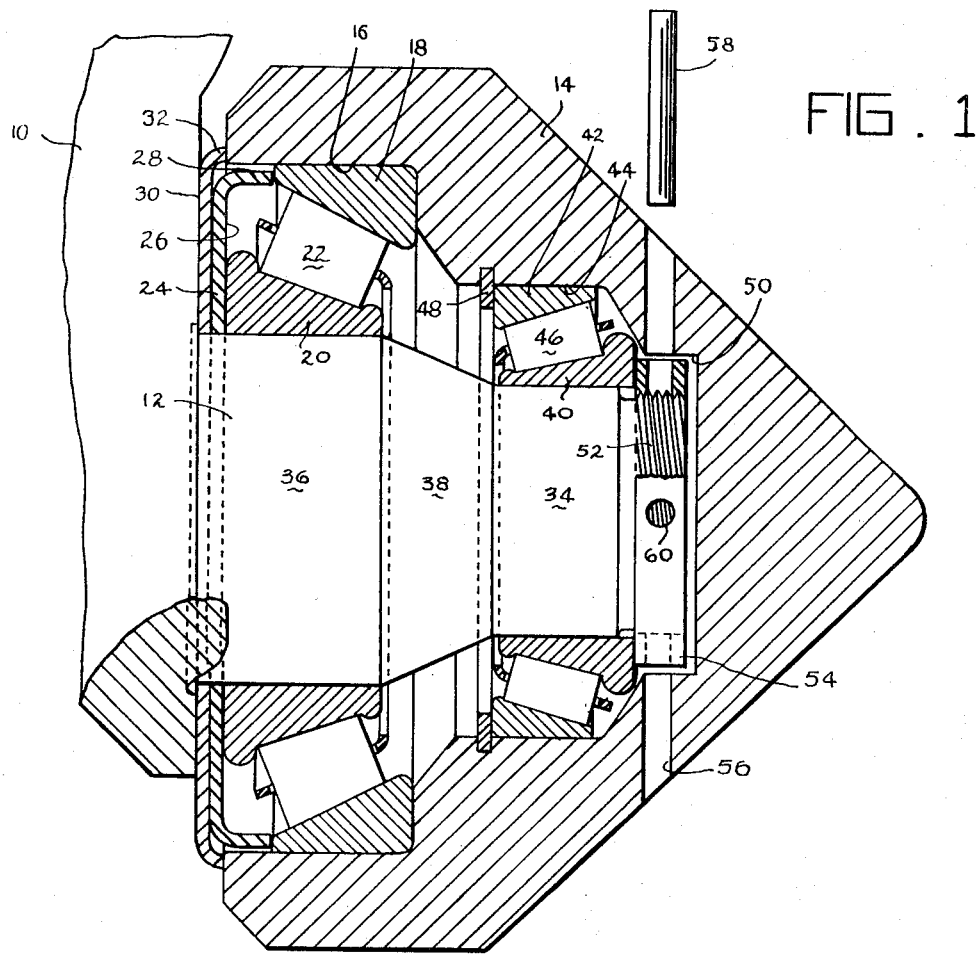
FIG. 1 is a vertical sectional view through a typical rolling type excavating tool constructed according to the present invention.

DETAILED DESCRIPTION OF THE INVENTION:

Referring to the drawings somewhat more in detail, in FIG. 1, 10 indicates a support member and extending angularly therefrom and, preferably, integral therewith is a spindle 12. The one end of the spindle is fixed to support member 10 while the other end is free. As has been mentioned, support member 12 may be drilled to receive the end of the spindle and the spindle welded in place in the support member. In this manner, used tools can be reconditioned as well as new tools manufactured.

Mounted on spindle 12 is surrounding relation thereto is a cutter body 14 generally triangular in longitudinal cross section and circular in transverse cross section. The body 14 is formed with a blind hole having a first socket region 16 for receiving the outer race 18 of an antifriction bearing having an inner race 20 and tapered rollers 22 interposed between the races and tapering inwardly toward the free end of spindle 12. Socket 16 engages the outer periphery of outer race 18 and that end of outer race 18 which faces the free end of spindle 12.

The spindle 12 engages the inner periphery of inner race 20 while that end of inner race 20 facing away from the free end of the spindle is abutted by a seal means 24 interposed between inner race 20 and an opposed annular surface on support member 10. Seal 24 comprises an inner disc, or diaphragm, 26 having an axially extending marginal flange 28 slidably engaging the end of outer race 18 nearer support member 10 and a second disc 30 having an axially extending marginal portion 32 which slidably engages the end of body 14 nearest support member 14.

Near the free end, spindle 14 comprises a portion 34 smaller in diameter than the portion 36 on which inner race 20 is mounted. A conical region 38 interconnects portions 34 and 36. Mounted on smaller diameter portion 34 is the inner race 40 of an antifriction bearing which has an outer race 42 disposed in cylindrical socket 44 of the blind hole in body 14 and tapered rollers 46 interposed between the races and tapering inwardly in a direction away from the free end of spindle 12. The end of outer race 42 which faces support member 10 is abutted by a snap ring 48 mounted in a groove provided in cylindrical portion 44 of body 12.

The body is also formed with a recess 50 at the bottom of the blind hole surrounding the threaded end part 52 of the spindle which projects beyond the end of the inner race 40 of the smaller antifriction bearing. Recess 50 receives a ring-like nut 54 which is threaded on threaded portion 52 of the spindle and which nut abuts the adjacent end of inner race 40.

It will be evident that when unit 54 is tightened up, the two antifriction bearings will be tightened up to any desired degree of preload and the aforementioned seal at the larger end of the body will be made effective while the body will be fixedly retained in assembled relation with the antifriction bearings and the spindle.

The socket 16 for the larger antifriction bearing and the cylindrical region 44 for the outer race of the smaller antifriction bearing and the recess 50 in which the nut 54 is disposed form a blind hole in body 14 into which spindle 12 extends. Since access cannot be had to the bottom of the blind hole for tightening and loosening nut 54, the body is formed with one or more holes 56 in the range of the recess 50. A pin 58 can be introduced through each hole for engagement with a radial hole 60 formed in nut 54.

One or more of the holes 60 can be provided and by availing of means, such as pin 58, the nut can be tightened up on the threaded portion 52 of the spindle by inserting pin 58 into hole 60 and then rotating the cutter body until the nut is tightened up to the desired degree. Preferably, at least two pins are used 180° apart to apply pure torque to the nut whereby the preload on the bearings can be determined by the torque exerted on the body.

Thereafter, and again availing of hole 58 and threaded hole 60 in the nut, a region of the threads on the spindle can be deformed thereby to lock the nut 54 in tightened position. The nut can also be locked in place, as by a roll pin, or the like, pressed through a hole, or slot, in the spindle and at the ends engaging holes 60 in the nut.

Thereafter, hole 56 is blocked as by welding material, or by brazing or cementing a plug therein, or by threading a pipe plug in place or in some other suitable manner. The nut can be loosened to remove the body from the spindle by drilling another hole in the body, or removing the aforementioned plug therefrom, and inserting a pin 58 through the hole into engagement with hole 60 in the nut and the nut can then rotate the body on the spindle in the proper direction.

Figure 2:
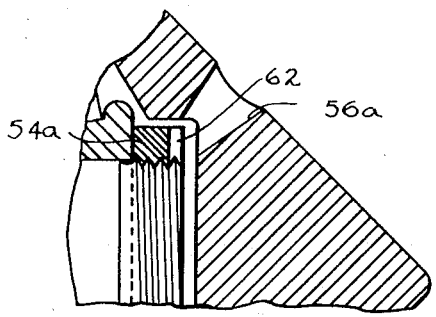
FIG. 2 is a fragmentary view showing a modification.

In those cases in which it might be considered to be objectionable to reduce the cross section of the nut by a hole drilled therethrough, the arrangement according to FIG. 2 can be used in which the nut 54a is formed with at least one radial notch 62 in the end to which access can be had by means of hole, or holes, 56a formed in the cutter body. Notch 62, it will be noted, exposes a portion of the threads on the spindle for being deformed by a suitable tool after the nut has been drawn up tight, or the spindle could have a hole to receive a pin having end portions in notch 62.

Figure 3:
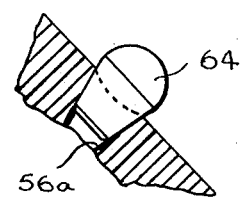
FIG. 3 is a fragmentary view showing one manner in which the access hole formed in the cutter body can be plugged.

FIG. 3 shows that hole 56a of FIG. 2 can advantageously be formed so as to taper inwardly in the inward direction and provide a hole into which a hard wear resistant carbide insert 64 can be pressed and which will not only close the hole but provide a cutting element on the cutter body.

Figure 4:
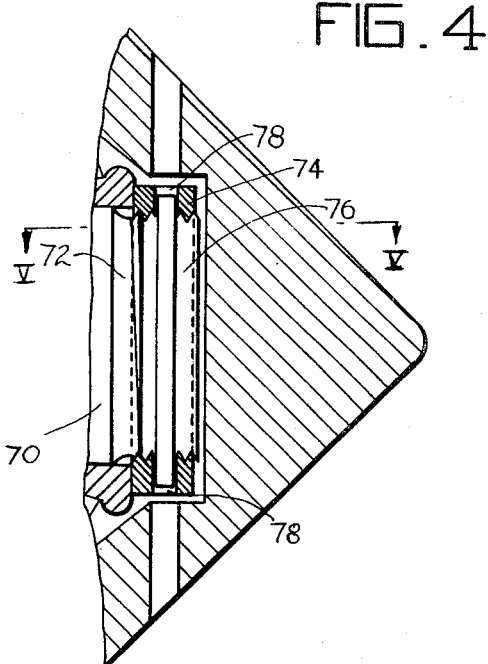
FIG. 4 is a fragmentary view showing a modification.
Figure 5:
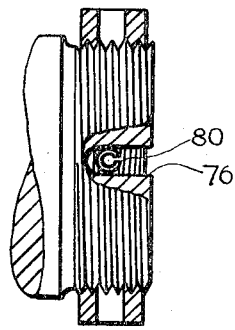
FIG. 5 is a plan section indicated by line V—V on FIG. 4.

FIG. 4 shows a modification in which the spindle 70 has a somewhat longitudinal threaded end part 72 thereon on which is seated an internally threaded nut 74. The spindle is axially slotted as at 76 so that when nut 74 is adjusted to the desired point, a pin, such as a roll pin, can be pressed through the radial holes 78 in the nut and engage the slot and thereby lock the nut to the spindle. As will be seen in FIG. 5, which shows the pin 80 in position, the slot 76 is of adequate length to permit the nut to be adjusted to the proper position without interfering with the introduction of the pin therein.

In any case, where the nut is locked with a pin, it will be understood that once the preload desired has been established on the bearings, if the pin hole in the spindle does not precisely align with the pin holes in the nut, the nut can either be tightened a little further or backed off a slight amount in order to permit the lock pin to be inserted. To this end, it is usually desirable for the nut to have at least six diametral holes therethrough so that a small amount of adjustment will move the nut into locked position when the proper preload has been established on the bearings.

Figure 6:
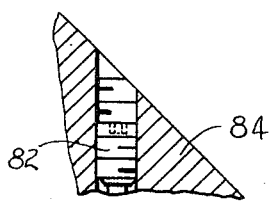
FIG. 6 is a fragmentary sectional view showing more in detail how the access hole in the body can be closed by a pipe plug.

FIG. 6 shows how a pipe plug 82 could be threaded into the access hole in the body 84 with the inner end of the pipe plug substantially flush with the periphery of the nut recess at the bottom of the blind hole in the tool body. A shoulder could be provided to stop the pipe plug in the proper position but by properly sizing the access hole and the pipe plug relatively, the pipe plug can be caused to draw up tight in the hole in about the position where the inner end is flush with the periphery for the recess of the nut.

Figure 7:
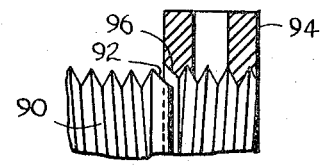
FIG. 7 is a fragmentary view showing how one or both of the end of the spindle and the nut could be provided with a tapered pilot region to facilitate starting the nut on the spindle.

Inasmuch as the nut must be placed in the recess therefor loosely and then threaded on the end of the spindle, it may be preferable to provide the side of the nut which faces the spindle and the end of the spindle on which the nut is threaded with complementary chamfer regions. This is illustrated in FIG. 7 wherein the end of spindle 90 has a chamfer 92 formed thereon whereas the end of 94 facing the spindle has a chamfer 96 at the end of the threaded bore therethrough. With the chamfers according to FIG. 7, no problem is encountered in starting the nut on the spindle.

In the case of any of the foregoing modifications, the threads on the end of the spindle and on the nut are preferably fine pitch to provide for rather fine setting of the preload on the bearings and also to reduce the tendency of the nut to loosen on the spindle.

As to the antifriction bearings provided, the larger antifriction bearing adjacent support member 10 preferably has a higher angle of taper than the smaller friction bearing near the free end of the spindle. Because of this, the larger antifriction bearing is adapted for carrying the principal axial loading on the cutter body while the smaller antifriction bearing is adapted for carrying the principal part of the radial loading on the bit body.

Both bearings, of course, sustain both axial and radial loads, but by virtue of the locations thereof, the larger bearing is better adapted to sustain the marginal portion of the axial thrust while the smaller bearing is positioned to sustain the marginal portion of the radial loading imposed on the cutter.

the construction shown in FIG. 1 is one wherein shaft 12 is integral with support member 10 but for drills that are to be repaired, it is possible to drill support member 10 and insert the end of spindle therein and weld the spindle in place. Thus, the combination of a spindle and bit body according to the present invention is adapted for use in connection with new manufacture as well as in connection with the repair of used bits.

Figure 8:
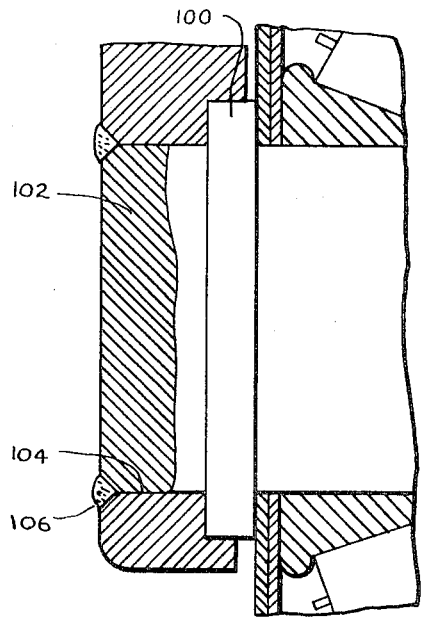
FIG. 8 is a fragmentary view showing a spindle welded into a support member.

In the case of the repair of used bit structures, it is possible to form spindle 12 with a radially outwardly projecting shoulder, as shown at 100 in FIG. 8, immediately leftwardly of the diaphragm or disc-like seal that seals the open end of the body and in such a case the body could be assembled with the spindle prior to mounting the spindle in the support member to be provided with new cutters. To connect spindle 12 to the support member, spindle 12 has a shank 102 receivable in a bore 104 in the support member and fixed thereon as by welding 106.

While it is not illustrated, it is well known to provide cutter bodies of the nature illustrated with holes distributed thereover and mount in the holes hard wear resistant inserts, such as cemented tungsten carbide inserts. The outer ends of the inserts protrude somewhat from the surface of the cutter body and are preferably domed, as shown in FIG. 3, and are highly effective for reducing hard formations and for imparting long life to the cutter body.

Modifications may be made within the scope of the appended claims.

What is claimed is:

1. In a rolling excavating tool; a support member, a spindle having one end fixed to said support member and projecting angularly therefrom, a cutter body having a blind hole formed therein into which said spindle extends, a first antifriction bearing having an inner race on said spindle adjacent said one end thereof and an outer race in the adjacent end of said blind hole, means stationary with said body abutting said outer race on the end facing away from said support member and means stationary with said spindle abutting the inner race on the end facing said support member, a second antifriction bearing having an inner race on said spindle near the free end thereof and an outer race in said blind hole near the bottom thereof, means stationary on the body abutting the end of the outer race of said second bearing which faces said support member, and a nut threaded on the free end of said spindle and disposed in the bottom of said blind hole and abutting the end of the inner race of said second bearing which faces away from said support member.

2. A rolling excavating tool according to claim 1 in which said first antifriction bearing is larger in diameter than said second antifriction bearing.

3. A rolling excavating tool according to claim 1 in which said antifriction bearings are roller bearings and the axes of the rollers of each bearing converge in the direction toward the other bearing.

4. A rolling excavating tool according to claim 1 in which said means stationary in the body and abutting the outer race of said second antifriction bearing is a snap ring of substantial proportions, said body being formed with a groove in which said snap ring is mounted.

5. A rolling excavating tool according to claim 1 which includes a shoulder at the junction of said spindle and support member facing the free end of said spindle, and sealing disc means surrounding said spindle and clamped to said shoulder by the inner race of said first bearing, said sealing disc means comprising a first axially resilient disc having an axially extending marginal portion concentric with said spindle and slidably engaging the adjacent end of the outer race of said first bearing and a second axially resilient disc having an axially extending marginal portion concentric with said spindle and slidably engaging the adjacent end of said body.

6. A rolling excavating tool according to claim 1 in which at least one of the free end of the spindle and the inboard end of the nut has a taper formed thereon to serve as a pilot to assist in starting the nut on the spindle.

7. A rolling excavating tool according to claim 1 in which said spindle has an axial projection thereon, said support member having a hole receiving said projection, and means fixing said projection in said hole.

8. A rolling excavating tool according to claim 7 in which said spindle includes a collar at the end of said projection nearest said body and forming the means abutting the inner race of said first bearing.

9. A rolling excavating tool according to claim 1 in which said nut is formed with engageable means for engagement by a tool introduced through at least one pluggable hole formed in said body in the range of the bottom of said blind hole, said tool and nut when interengaged being rotatable by rotation of said body on said spindle thereby to tighten the nut on the spindle.

10. A rolling excavating tool according to claim 9 in which said engageable means exposes a region of threads on the end of said spindle for engagement by a thread deforming tool introduced into said hole after said nut has been tightened on said spindle.

11. A rolling excavating tool according to claim 9 in which said nut is in the form of an internally threaded ring and said tool engageable means comprises at least one radial recess in said nut.

12. A rolling excavating tool according to claim 9 in which said nut is in the form of an internally threaded ring and said tool engageable means comprises at least one radial notch formed in the end of the nut facing the bottom of said blind hole.

13. A rolling excavating tool according to claim 9 which includes threaded plug means threaded into and sealingly closing said pluggable hole.

14. A rolling excavating tool according to claim 9 which includes a hard wear resistant insert press fitted into said pluggable hole to close and seal said hole.

15. A rolling excavating tool according to claim 9 in which said spindle is cross drilled in the threaded end region and said nut is provided with means to receive a lock pin inserted in the cross drill in the spindle.

16. A rolling excavating tool according to claim 9 in which said spindle is slotted from the outboard end and said nut is cross-drilled to receive a lock pin passing through the slot in the spindle.

* * * * *